July 14, 1970  C. W. SCHOLL ET AL  3,520,754
METHOD OF HEAT SEALING A THERMOPLASTIC COVER MATERIAL TO A
BASKING MEMBER
Filed Feb. 16, 1967  2 Sheets-Sheet 2
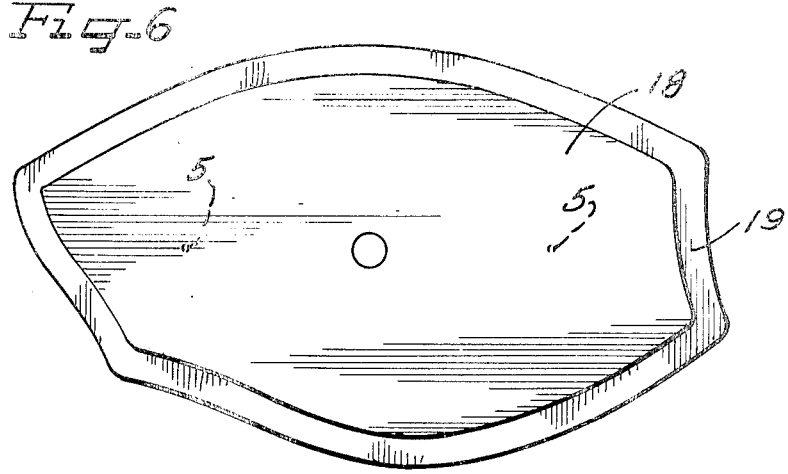
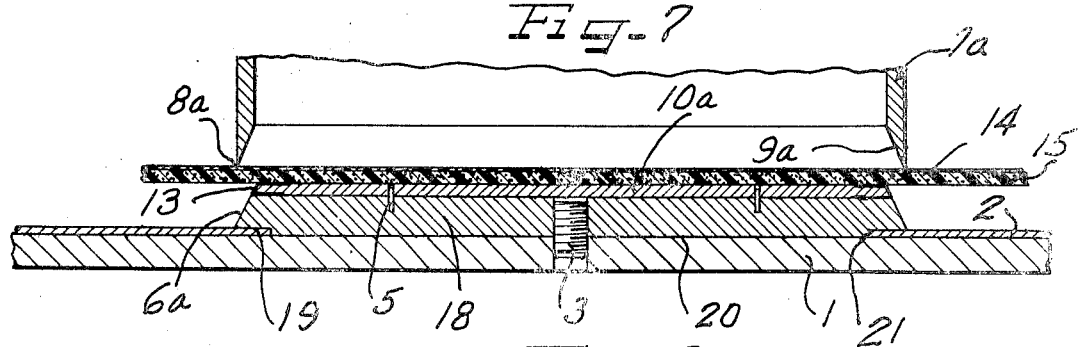
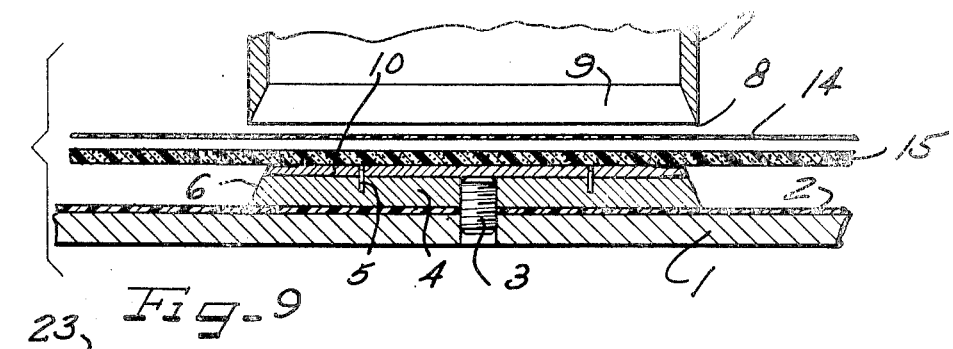
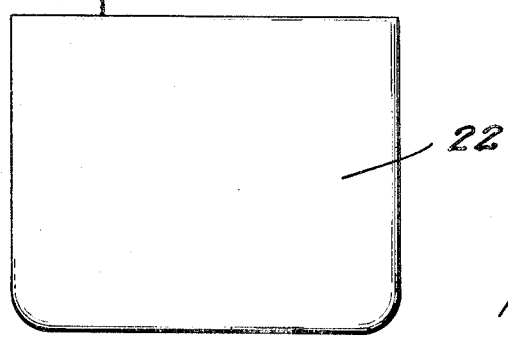
INVENTORS
Carl W. Scholl
Milo L. Raffaelli, Sr.
BY *Hill, Sherman, Meroni, Gross & Simpson* ATTORNEYS

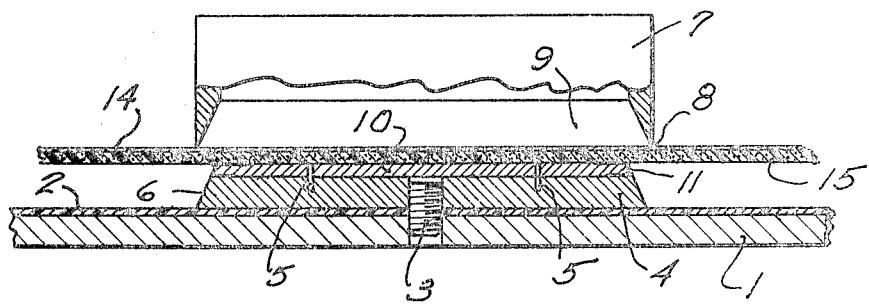
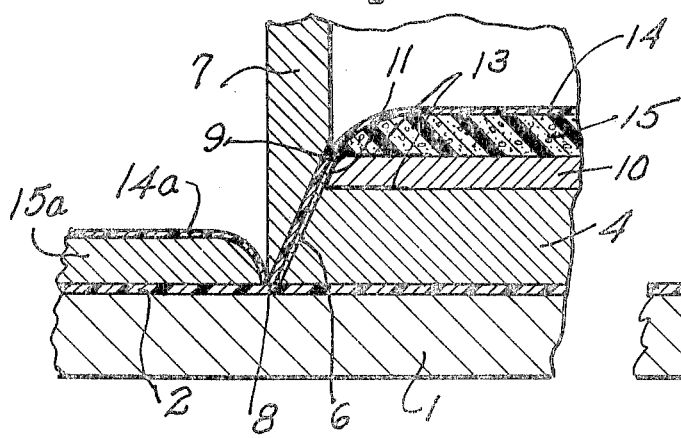
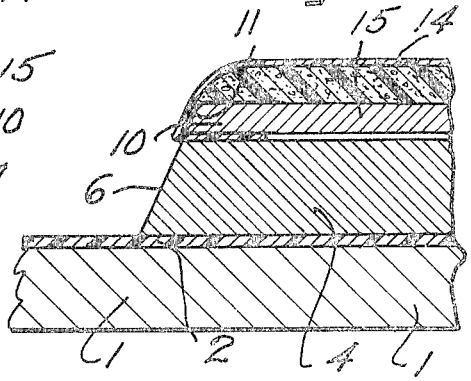
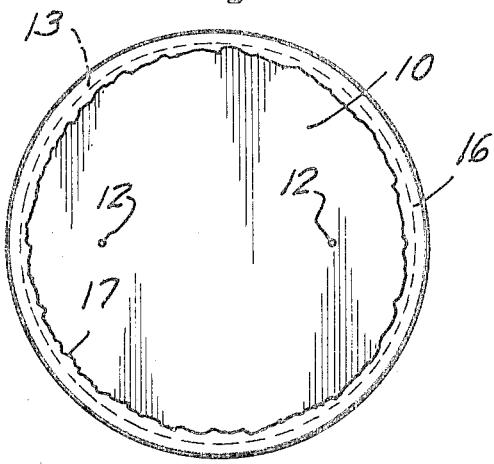
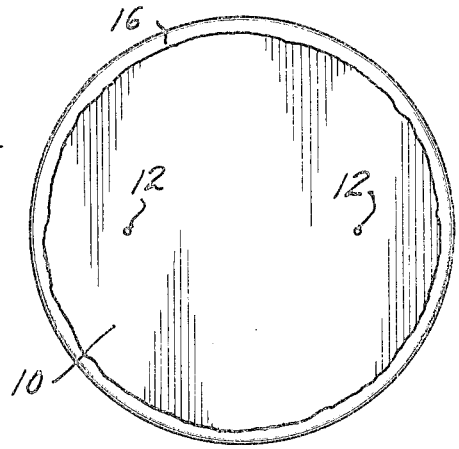
INVENTORS
Carl W. Scholl
Milo L. Raffaelli, Sr.

United States Patent Office 3,520,754
Patented July 14, 1970

3,520,754
METHOD OF HEAT SEALING A THERMOPLASTIC COVER MATERIAL TO A BACKING MEMBER
Carl W. Scholl and Milo L. Raffaelli, Sr., Chicago, Ill., assignors to The Scholl Mfg. Co., Inc., Chicago, Ill., a corporation of New York
Filed Feb. 16, 1967, Ser. No. 616,721
Int. Cl. B29c 19/04
U.S. Cl. 156—273                                          4 Claims

ABSTRACT OF THE DISCLOSURE

The invention relates to a method of heat sealing a thermoplastic cover to a backing member. The cover material is electronically heat sealed to the backing member at a marginal area of the rear face of the backing member where a thermoplastic striping is applied.

BACKGROUND OF THE INVENTION

Field of the invention

The instant invention or discovery relates to die means for electronically heat sealing a flexible thermoplastic covering to a more rigid backing member, which in most cases will be non-thermoplastic material but provided with a striping of thermoplastic material to effect the welding of the backing member to the flexible covering means. One stroke of the die results in the completion of the article, making a heat and tear seal seam and heat sealing the covering means to the side edge of the backing member and for a marginal portion on the rear face of the backing member. The resultant article is a panel-like member and may be formed in appropriate sizes and contours for many usages, such as insoles for articles of footwear, wall panels, furniture panels, stool and chair seats and backs, vehicle interior panels, and in many other ways as will be apparent to one skilled in the art. The instant invention or discovery also relates to a new and novel method of making such panel-like members.

Description of the prior art

Heretofore, die means have been provided for electronically heat sealing the same type of thermoplastic covering to the same type of more rigid backing member. However, such dies as previously made and the method employed in their use, resulted only in heat sealing the covering material directly to one face of the backing member, leaving the side edge of the backing member totally exposed and providing an unsightly joint around the margin of the covered face of the backing member, resulting from the heat and tear seal seam and removal of waste. In many cases therefore, it was necessary to paint or otherwise color the exposed edge of the backing member to match the color of the covering, and regardless of how much care was exercised in this process it was virtually impossible to obtain a true color match. Also, regardless of the coloring of the backing member edge that edge was still left exposed particularly in the case of insoles for articles of footwear, to the adverse effects of moisture including natural moisture, perspiration, and the like and in an objectionably short time the backing member frequently deteriorated at the edge by virtue of delamination, accumulation of dirt, etc. In addition, many times with the prior art panel-like members for various reasons, the member could not be secured entirely over its exposed face to a surface to be covered but would be free from that surface adjacent the edge of the member permitting dirt, moisture, etc. to enter beneath the member and the surface intended to be covered by the panel-like member, and the attachment was distinctly unsightly.

SUMMARY OF THE INVENTION

The apparatus and method embodied in the instant invention when utilized and practiced produce a panel-like article in which thermoplastic covering material encloses one complete face, the side edge wherever desired, and a marginal portion of the opposite face of a more rigid backing member, and the cover material is heat sealed at least to the side edge and the marginal portion of the opposite face. This results in completely enclosing a marginal portion of the backing member wherever desired, including both faces and the edge of such marginal portion. The die means effects a heat and tear seal seam and the entire heat sealing and cutting through of the waste is performed in one single stroke of the die. Such a joining of the covering material to a backing member has not heretofore been accomplished by heat sealing die means. The problems and deficiencies existing in the prior art, as mentioned above, are completely solved and overcome by the instant invention. The die means and practice of the method are comparatively extremely economical and the resulting panel is far better in appearance, the step of coloring the edge of the backing member is eliminated, the edge of the backing member is fully protected and enclosed, and the appearance of the panel-like member when mounted on a surface is not adversely affected even though the entire rear face of the backing member is not successfully secured to the surface. During the practice of the method embodied in this invention, a heat and tear seal seam is established along the side edge of the backing member and during the operation softened or melted cover material is flowed by heat and pressure underneath the backing member and heat sealed to the uncovered face thereof, and the die means are capable of performing that method.

BRIEF DESCRIPTION OF THE DRAWINGS

FIG. 1 is a fragmentary partial central vertical sectional and partial elevational view of die means embodying principles of the instant invention showing the same in position just prior to a heat sealing operation;

FIG. 2 is a greatly enlarged fragmentary vertical sectional view of the structure of FIG. 1 showing the die means in heat and tear sealing position;

FIG. 3 is a view similar to FIG. 2 but showing the upper die and waste material removed from the panel-like article;

FIG. 4 is a bottom or rear plan view of the article made by the die means seen in FIGS. 1, 2 and 3;

FIG. 5 is a view the same as FIG. 4 but showing the finished article;

FIG. 6 is a bottom plan view of a lower die pedestal of the character utilized when the resultant article has an irregular contour;

FIG. 7 is a fragmentary vertical sectional view of the die means assembled for heat sealing an article having the contour of the pedestal of FIG. 6;

FIG. 8 is an exploded vertical sectional view illustrating how the covering material may be initially utilized in separated layers, if so desired; and FIG. 9 is a front view of a finished article made in accordance with the instant method and by the instant die means, but of still different contour.

DESCRIPTION OF THE PREFERRED EMBODIMENTS

The apparatus embodied in the instant invention or discovery may be shaped so as to provide panel shaped articles of various sizes and various contours, depending upon the intended use for the resultant article. There is a slight difference in structure of the die means between those for forming circular articles and those for forming non-circular articles. The method is the same regardless of the size and contour of the resultant article. By way of example, we have shown articles of three different shapes and sizes herein.

The apparatus of FIGS. 1, 2 and 3 is shaped to heat seal a panel-like member in the form of a circular stool seat or the like. The heat sealing apparatus includes a lower die 1 which is preferably in the form of a flat electrically conductive plate. While not essential in all cases, it is most frequently desirable to utilize a buffer sheet or plate 2 disposed on top of the die 1, the buffer sheet being of dielectric material, there being many such materials suitable for the purpose including a urea-formaldehyde condensation product and polytetrafluoroethylene, which are both satisfactory. This dielectric plate 2 is apertured around an upstanding bolt or stud 3 secured in the base 1 to centrally engage within an aperture of an electrically conductive pedestal 4 resting on the buffer plate. This pedestal 4 has a pair of upstanding pins 5—5 mounted therein, these pins being of dielectric material and so mounted for the purpose of enabling the proper positioning of a backing member on the pedestal. For a round stool seat, the pedestal will of course be circular and is preferably provided with a bevelled edge 6, one satisfactory angle of bevel being approximately 24° from the vertical. The edge 6 slopes downwardly and outwardly from the top face of the pedestal, which top face will be of substantially the diameter of the finished product. The holding stud or bolt 3 contacts the pedestal in the center thereof.

The sealing means also includes an upper die 7 which is in the form of a circular skirt of conductive material. This die 7 is mounted in a known manner upon a base plate and maintained in exact alignment with the pedestal on the lower die so that the upper die fits evenly around the pedestal but does not come in contact with the same. The clearance between the upper die 7 and the pedestal will be in accord with the thickness of the cover layer of the material being heat sealed to the backing member. The die skirt 7 terminates in a circular knife edge 8 at the lower end thereof, the outside diameter of the skirt remaining uniform, while on the inside thereof the skirt is bevelled from the outer face to the inner face as indicated at 9, complementally to the bevel 6 on the pedestal of the lower die. The bevel 9 in the upper die is preferably of sufficient length to overlie the edge of the pedestal and the edge of a blank disposed upon the pedestal, as seen best in FIG. 2.

Both dies are mounted in a known form of press equipped with electronically heat sealing means to pass a charge of ultrahigh frequency electric current from one die to the other to effect a heat and tear seal seam. The upper die is usually brought down under pressure toward the lower die and when substantially the position of FIG. 2 is reached with the dies in effect closed current will pass from the inside bevel on the upper die to the outside bevel on the lower die through the material being heat sealed, and the knife edge 8 will establish the tear seam permitting the easy removal of waste stock around the article being formed.

The finished panel-like article comprises a backing member 10 made of any suitable material, depending upon the use intended for the article. For insoles for footwear, the material may satisfactorily be leather or the equivalent, or a highly satisfactory material such as fiberboard impregnated with latex or another suitable substance to render the same elastomeric so that the backing member will not cup, harden, crack or lose its shape during usage. In the case of wall and furniture panels, chair seats, and the like the fiberboard materail is quite satisfactory, and a wooden backing member might also be used if desired.

The backing member is first preformed or precut to the desired size and contour, such contour being circular in the case of the article seen in FIGS. 4 and 5. The backing member is also preferably provided with a bevelled edge 11 of the same angle as the bevelled edge 6 on the die pedestal 4. The backing member is also provided with a pair of spaced apertures or recesses 12—12 therein to fit over the die pins 5—5 to insure proper positioning of the backing member on the die pedestal. Further, the backing member is given a marginal stripe 13 of vinyl, acetate, or some other thermoplastic material that responds to electronic heat sealing with another thermoplastic substance, a vinyl cement being highly satisfactory. As seen best in FIG. 2, this stripe is on the marginal portion of the upper face of the backing member, extends over the bevelled edge thereof, and extends along the margin of the under or rear face of the backing member. The stripe 13 may be applied by painting, spraying, dipping or in any other suitable manner, and when applied becomes dry and is usually relatively invisible. The stripe is also of such thinness as not to interfere with proper mounting of the backing member on a surface to be covered by the resultant article and requires no particular care in its application, since if any excess material is applied, it is of no moment.

The resultant article also includes a cover 14 which is preferably a relatively thin sheet of thermoplastic material compatible for electronic heating sealing purposes with the material of the stripe 13 on the backing member. A vinyl sheet is highly satisfactory, and in many cases an expanded vinyl sheet is utilized because of its pleasing grained appearance, its extreme durability, and the fact that it offers a pleasing feel to the foot or body of a user. In most cases, it is desirable to utilize a thicker sheet 15 of cushioning material between the cover and backing member, this being especially true for furniture panels, insoles, and other articles where the body comes in contact therewith. It is not essential that the layer 15 be of heat sealable thermoplastic material, but thermoplastic foams that are heat sealable afford an excellent cushioning medium. Such foams are vinyl foam, urethane foam, a foam comprising a urethane skeleton impregnated with vinyl, among others. The cover 14 and cushioning sheet or layer 15 may be in the form of a laminate with the two sheets secured together in face-to-face relationship so they may be handled as one piece. These sheets 14 and 15 may also be utilized separately, not connected to each other until after the heat seal seam has been made. Each way has its advantages in manufacture depending upon circumstances. For example, laminate is much easier to handle particularly where there is a large order for like articles of the same color. Where special orders are requested asking for numerous colors of articles, it may be desirable to utilize separate sheets so that the foam material may be of the same color while the desired variances in color would be embodied only in the separate cover sheets, thereby saving storage space and lessening the value of the inventory on hand. In either event, the sheets are preferably of indefinite size from which a large number of articles may be made.

In making the finished article, the die pedestal is first secured to the negative electrode plate 1 by way of the stud 3 with the dielectric buffer plate 2 disposed therebetween except for the stud. The preformed backing member is next positioned on top of the pedestal by means of the pins 5—5. The cover sheet 14 and the cushioning sheet 15 are next disposed over the backing member. Then the upper die 7 is brought down to the position seen in FIG. 2, and this movement folds the cover and foam layer over the side edge of the backing member, compressing the foam layer toward the lower face of the backing member by virtue of the relatively intimate fit between the skirt of the upper die and the backing member. Contemporaneously with the time when the upper die reaches the position seen in FIG. 2, a charge of ultrahigh frequency current is passed through the skirt of the upper die, and the easier path for this current to reach the lower die would be through the pedestal 4 and the stud 3, rather than through the dielectric buffer plate 2. This current, therefore, passes somewhat laterally from the bevel 9 on the skirt of the upper die to the bevel 6 of the pedestal 4. Of course, the upper die is brought down under pressure so as to establish a tear seam at the lower knife edge 8 of the die. The direction of the travel of the current causes additional heat beneath that portion of the stripe 13 on the lower or rear face of the backing member, and that fact plus the pressure causes the thermoplastic cover material to flow in between the backing member and the pedestal and become fused to the stripe 13, as shown in exaggerated fashion in FIG. 3. Of course, there will be a similar bond with the cover material and that part of the stripe over the bevelled edge of the backing member, and possibly some bond on that portion of the stripe on the covered face of the backing member. Since the finished article is circular the path of travel for the current from the upper die to the lower die is equidistant from any point to the stud 3, and therefore a substantially uniform marginal portion 16 of the cover material is sealed to the rear face of the lower die as indicated in FIGS. 4 and 5. In some instances, the material flowing in over the rear face margin of the backing member may pass beyond the adhesive stripe 13 in somewhat the form of a feather edge 17, FIG. 4, and be free from the backing member. This excess material may easily be removed by passing the rear face of the article lightly over a grinding wheel or in an equivalent manner resulting in substantially smoother and firmly bonded marginal portion as seen in FIG. 5.

In FIGS. 1, 2 and 3 the cover sheet and foam sheet are shown in the nature of a laminate. In FIG. 8 we have illustrated the positioning of separate cover and foam sheets. The ultimate result is the same, and in both instances waste material 14a and 15a, FIG. 2, may readily be separated from the finished article. The result is the provision of an article wherein cover material is heat sealed to a backing member completely over the side edge and a portion of the rear face thereof giving an article of pleasing appearance with a smoothly curvate margin on the covered side thereof and having the advantages expressed above.

In FIGS. 6 and 7 we have illustrated the arrangement of die means for providing a panel-like article of irregular contour. In this instance, the finished article will be in the form of a half insole for articles of footwear having the same general irregular contour as the pedestal 18 seen in FIG. 6. This pedestal is attached to the lower die plate 1 by means of a stud 3 and is provided with pins 5 to properly locate the backing member 10a which has the same general configuration as the pedestal. The upper die member embodies the skirt 7a with the knife edge 8a, and a bevel 9a complemental to the bevel edge 6a of the pedestal, and the die skirt also has the contour of the pedestal. The die parts function in the same manner as above described in connection with FIGS. 1, 2 and 3. However, in this instance in order to establish an equal path for current to pass from the skirt of the upper die to the lower die plate 1 the pedestal 18 is provided with a marginal undercut 19 of equal width and depth throughout. As seen in FIG. 7, the pedestal seats squarely upon the upper face of the lower die plate, as indicated at 20, and the dielectric buffer plate 2 underlies the pedestal only within the undercut 19 as indicated at 21. With this arrangement, the current travels the same distance to pass from the upper die to the lower die plate 1 from any point on the contour of the resultant device and therefore the device will have a heat sealed marginal portion of cover material on the rear face thereof that is substantially uniform all the way around the same as the marginal portion 16 on the article of FIG. 5.

To indicate a further variance in shape of the resultant panel-like article, we have shown a panel 22 in FIG. 9 having a perfectly straight edge 23 along one portion thereof. To produce a device of this shape, an undercut die would also be necessary in order to provide equal distance from every point of the contour for the electric current to follow before it reaches the pedestal or the electrode die 1.

Articles of other and various contours can equally as well be made with the instant invention and employing the instant method.

While, in some cases, it is not essential to have a bevelled edge upon the pedestal and the backing member, such a bevelled edge results in a more pleasing appearance to the resultant article and augments the ease with which the heat seal seam may be established entirely over the edge of the backing member and partially on the rear side thereof.

It will be understood that modifications and variations may be effected without departing from the scope of the novel concepts of the present invention.

We claim as our invention:

1. The method of making a panel-like article embodying a backing member and thermoplastic cover material, wherein the improvement comprises:
   striping the side edge and a marginal area of the rear face of the backing member extending inwardly from the bounding edge of the backing member with a thermoplastic material compatible for heat sealing purposes with the cover material, and
   electronically heat sealing the cover material over and to the material of said striping.

2. The method of claim 1, including flowing cover material by heat and pressure beneath the backing member to fuse to the striping on the rear margin of the backing member.

3. The method of claim 1 wherein upper and lower heat sealing dies are utilized to form a circular article including the steps of:
   securing a round conductive pedestal centrally by conductive means to the lower die, and
   placing a dielectric buffer between said pedestal and lower die except for said securing means, prior to heat sealing.

4. The method of claim 1 wherein upper and lower heat sealing dies are utilized to form an article having a non-circular contour, including the steps of:
   positioning a conductive pedestal of the contour of the article and having a marginal undercut of uniform width in the lower face thereof extending inwardly from the bounding edge of the pedestal on the lower die, and in the lower face thereof on the lower die, and
   positioning a dielectric buffer between said pedestal and lower die only within said undercut, prior to heat sealing.

References Cited

UNITED STATES PATENTS

| 3,058,868 | 10/1962 | Schroeder | 156—202 X |
| 3,389,033 | 6/1968 | Ullman | 156—216 |
| 3,094,716 | 6/1963 | Friedman | 156—202 |

CARL D. QUARFORTH, Primary Examiner

S. J. LECHERT, Jr., Assistant Examiner

U.S. Cl. X.R.

156—212, 216, 272